United States Patent [19]

Sandell et al.

[11] Patent Number: 4,846,402
[45] Date of Patent: Jul. 11, 1989

[54] SPRAY NOZZLE AND METHOD OF PREVENTING SOLIDS BUILD-UP THEREON

[75] Inventors: Michael A. Sandell, Coraopolis; Dennis M. Tulenko, Pittsburgh, both of Pa.

[73] Assignee: Wheelabrator Air Pollution Control, Inc., Pittsburgh, Pa.

[21] Appl. No.: 151,998

[22] Filed: Feb. 3, 1988

[51] Int. Cl.[4] .............................................. B05B 7/04
[52] U.S. Cl. ...................................... 239/9; 239/429; 239/600
[58] Field of Search ...................... 239/8, 9, 104, 105, 239/106, 336, 418, 419.3, 429, 600, 430, 552, 550, 601

[56] References Cited

U.S. PATENT DOCUMENTS

| | | | |
|---|---|---|---|
| Re. 29,083 | 12/1976 | Nielsen | 239/224 |
| 2,815,983 | 10/1951 | Hunter | 239/105 |
| 2,896,571 | 7/1959 | Geersten | 239/105 X |
| 2,907,772 | 2/1961 | Boosinger et al. | 239/105 |
| 2,965,312 | 12/1960 | Hale | 239/416.5 X |
| 3,864,249 | 2/1975 | Wallis | 209/1 |
| 3,885,401 | 5/1975 | Banike | 137/242 X |
| 3,896,998 | 7/1975 | Vertue | 239/106 |
| 4,036,434 | 7/1977 | Andersen et al. | 239/8 |
| 4,197,278 | 4/1980 | Gehri et al. | 423/242 |
| 4,411,389 | 10/1983 | Harrison | 239/600 X |
| 4,545,157 | 10/1985 | Saurwein | 51/439 |
| 4,573,639 | 3/1986 | Logue | 239/569 X |

OTHER PUBLICATIONS

"Turbotak Nozzles"—Sales Brochure of Turbotak Inc., Waterloo, Ontario.
Two Photographs of 2-Fluid Spray Nozzles Used by Austell Boxboard Company from about Late 1983 until Jan. 1986.

Primary Examiner—Duane A. Reger
Assistant Examiner—Kevin P. Weldon
Attorney, Agent, or Firm—Banner, Birch, McKie & Beckett

[57] ABSTRACT

The present invention relates to a replaceable insert adapted to fit within the atomization port of a spray nozzle used to atomize a gas/slurry mixture. The nozzle insert has a configuration which greatly minimizes the build-up of solids on the end of the insert, the forward face of the nozzle as well as around the atomization ports when atomizing a slurry. The improved features of the nozzle insert include (a) the interior fluid conveying passage has a constant diameter through the head of the insert; (b) the downstream end of the head is tapered and ends in a circular knife edge at the spray outlet; and (c) the tapered head extends outwardly from the forward face of the nozzle a distance sufficient for the spray outlet to be positioned beyond eddy currents which form during atomization of the gas/slurry mixture.

20 Claims, 2 Drawing Sheets

SPRAY NOZZLE AND METHOD OF PREVENTING SOLIDS BUILD-UP THEREON

FIELD OF THE INVENTION

The present invention relates to a spray nozzle used for spraying a solids-containing liquid. In particular, the present invention relates to a replaceable insert adapted to fit within the atomization port or ports of a spray nozzle adapted to atomize a solids-containing liquid with a gas. The nozzle insert has a configuration which greatly minimizes the build-up of solids on the end of the insert, the forward face of the nozzle as well as around the atomization ports.

BACKGROUND OF THE INVENTION

Spray nozzles of the type used herein are well known and have been used in a wide variety of applications, including spray drying, exhaust gas scrubbing and snow making, to name just a few. One known multi-port spray nozzle adapted to atomize a gas/liquid mixture is illustrated in FIG. 1. The nozzle 10 shown in FIG. 1 has a sleeve insert 40 in accordance with the present invention. The spray nozzle is manufactured and sold by Turbotak, Inc. of Waterloo, Ontario, Canada under license from Caldyn Apparatebau GmbH, Ettlingen, Germany.

The atomization of solids-containing liquids, such as a lime slurry, can be extremely abrasive on the nozzles, and in particular on the atomization ports of the nozzles. When used in these applications, the spray nozzles are typically sold with sleeve-like inserts which are adapted to fit within the atomization port or ports and to be removed and replaced after they become worn. The Turbotak nozzles have to date been sold with replaceable sleeve inserts having a different design from the sleeve insert 40 illustrated in FIGS. 1 and 2. The Turbotak inserts have a downstream end which is substantially flush with the forward face of the spray nozzle. The downstream end of the Turbotak insert has a flat annular surface which is fairly wide, having a thickness on the order of about ¼ to ½ inch, as measured along an outer diameter of the insert.

Unfortunately, the Turbotak nozzle and insert have experienced problems when used to spray a solids-containing liquid such as a lime slurry. When spraying a lime slurry, lime quickly begins to build-up on the wide downstream annular face of the insert and on the forward face of the nozzle. In many cases the build-up starts to form within just a few hours after spraying has begun. The lime build-up eventually has an adverse effect on the atomization properties of the spray nozzle. Once this occurs, the nozzle must be shut down in order to remove the solids built up on the inserts and the forward face of the nozzle. In severe cases the inserts must be entirely replaced. With certain types of solids-containing liquids, such as lime slurries, the nozzles have to be shut down every few days in order to perform the cleaning/replacement procedure, making the nozzles commercially unacceptable in these applications.

Accordingly, it is an object of the present invention to provide a replaceable nozzle insert which is not subject to the solids build-up problem of the prior art inserts. It is a further object of the invention to provide a replaceable nozzle insert which can be left in operation for longer periods of time without requiring shutting down the nozzle in order to clean and/or replace the nozzle and the inserts.

SUMMARY OF THE INVENTION

These and other important objects are met by an improved sleeve insert and a method of minimizing solids build-up around the atomization ports of a spray nozzle. The sleeve insert is adapted to be placed in a nozzle for atomizing a liquid slurry and gas mixture. The nozzle has a hollow body with a slurry inlet, a gas inlet and means fluidly connecting said inlets with at least one atomization port in a forward face of the nozzle. The sleeve insert is removably received in the atomization port. The sleeve has a base, a central portion, a head and an interior fluid conveying passage therethrough. The interior passage within the base is fluidly connected to the liquid slurry inlet of the nozzle. The central portion of the insert is fluidly connected to the gas inlet of the nozzle and has a plurality of gas flow passages for admitting gas into the interior fluid conveying passage where the gas is mixed with the liquid slurry. The head of the insert has a spray outlet at its downstream end. The improved features of the nozzle insert include (a) the interior fluid conveying passage has a constant diameter through the head of the insert; (b) the downstream end of the head has an inwardly tapered surface ending in a circular knife edge at the spray outlet; and (c) the head extends out from the forward face of the nozzle. The spray nozzle, in combination with the sleeve insert of the present invention, is designed to be used in applications such as spray drying and gas scrubbing wherein a gas stream flows past the nozzle. In applications where the nozzle is positioned in a flowing gas stream and sprays the atomized liquid slurry and gas mixture thereinto, eddy currents tend to form along the forward face of the nozzle. It is a feature of the nozzle insert of the present invention that the head extends outwardly from the forward face of the nozzle a sufficient distance to ensure that the spray outlet is positioned substantially beyond the eddy currents caused by the gas flowing past the nozzle. The combination of elements (a), (b) and (c) greatly minimizes the build-up of slurry solids around the atomization ports, on the heads of the inserts and on the forward face of the nozzle during atomization of the slurry and gas mixture.

The present invention also comprises a method of minimizing solids build-up around the atomization port and on the forward face of a nozzle during the atomization of a solids-containing liquid with a gas. This is accomplished by positioning a removable sleeve insert in the atomization port or ports of the nozzle. The insert has (i) a head having an inwardly tapered surface ending in a circular knife edge at a spray outlet, and (ii) an interior fluid conveying passage, which passage has a constant diameter through the head. When spraying an atomized liquid and gas mixture into a flowing gas stream, such as in spray drying and gas scrubbing applications, eddy currents are formed by the gas flowing around the nozzle. In these applications, the head should extend outwardly from the forward face of the nozzle a distance sufficient for the spray outlet to be positioned substantially beyond eddy currents which form along the forward face of the nozzle. The liquid and gas mixture is pumped through the interior fluid conveying passage and out of the spray outlet to effect atomization.

DETAILED DESCRIPTION OF THE INVENTION

Figure 1:
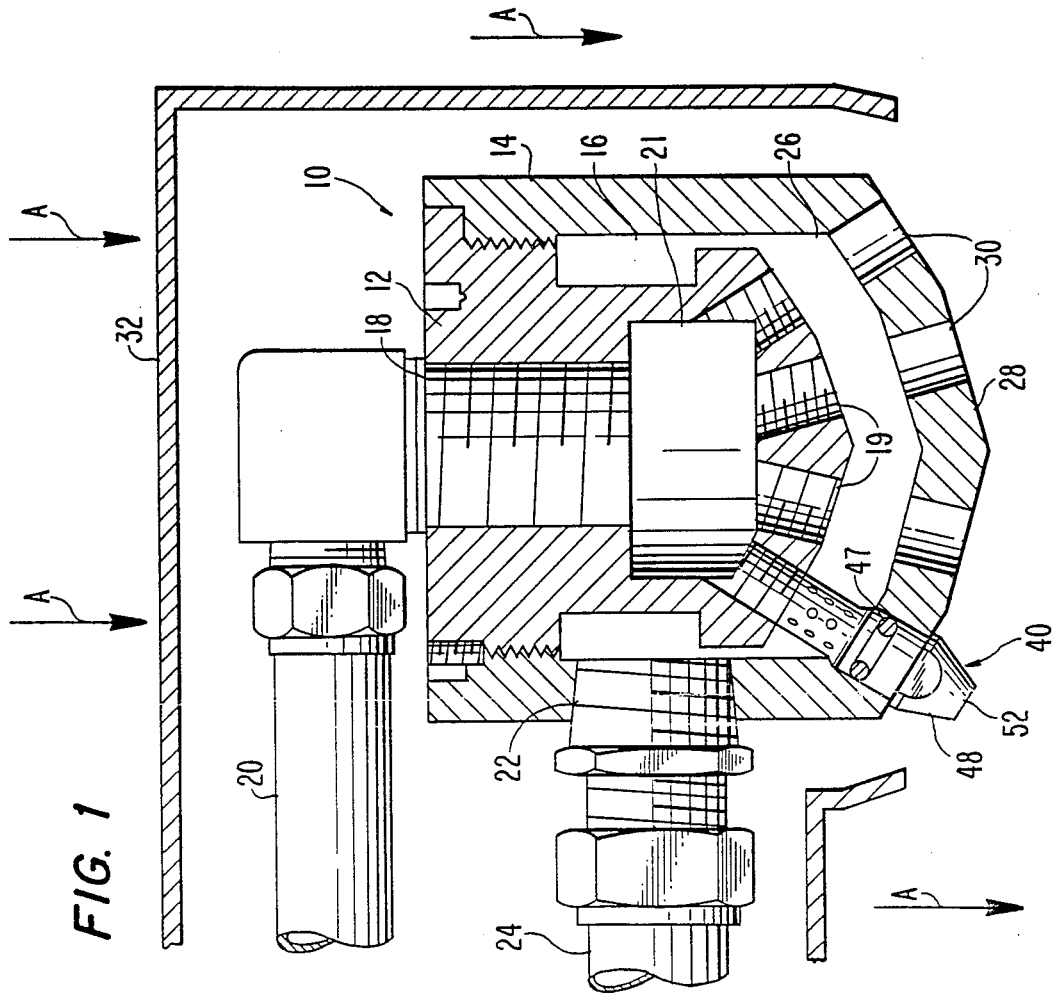
FIG. 1 is a side view, shown partly in section, illustrating a prior art nozzle having a replaceable sleeve insert according to the present invention.

Referring now to FIG. 1, there is illustrated a multi-port nozzle 10 designed to atomize a liquid and gas mixture. Although a multi-port nozzle has been chosen for illustration in the Figures, it will be understood by those skilled in the art that the sleeve insert of the present invention is equally well suited for a single port nozzle. For purposes of illustration, the nozzle 10 is described in connection with the atomization of an aqueous lime slurry and air mixture in exhaust gas scrubbing applications. In such applications, the nozzle 10 is positioned in a conduit or chamber (not shown) in which hot combustion exhaust gases flow. The hot combustion gases flow past and around the nozzle 10 which may optionally be provided with a protective lance 32. In the FIG. 1 embodiment, the atomized lime slurry and air mixture is injected co-currently into (i.e., in substantially the same direction of flow as) the hot combustion exhaust gases, which are shown flowing in the direction of arrows A. Other flow arrangements are also possible. For instance, the nozzles may be mounted so that the atomized slurry and air mixture is sprayed in a direction at an angle to, or even perpendicular to, the direction of flow of the hot combustion gases. Alternatively, the slurry and air mixture may be sprayed in direct countercurrent relationship (i.e., the atomized mixture is sprayed in a direction substantially opposite to the direction of flow of the hot combustion gases) to the flow of the hot combustion gases. In these alternate gas flow and slurry spray arrangements, the design, positioning and operation of the lance 32 may be appropriately adjusted as is known to those skilled in the art.

The nozzle 10 illustrated in FIG. 1 comprises an inner body portion 12 and an outer body portion 14. Body portions 12 and 14 may be threadably or otherwise fixedly connected to one another. At the rear end of body portion 12 is an opening comprising the liquid slurry inlet 18. Slurry inlet 18 is adapted to threadably receive a slurry inlet line 20. Line 20 is fluidly connected to the hollow interior space of body portion 12 through inlet 18. This hollow interior comprises a slurry manifold 21 which in turn is fluidly connected with a plurality of inner body ports 19. Thus, the liquid slurry is pumped through line 20, entering nozzle 10 through inlet 18. The slurry flows through the hollow interior of body portion 12 and is distributed by manifold 21 to the inner body ports 19.

At the side of the nozzle 10 is provided a gas inlet 22 which is adapted to threadably receive a gas inlet line 24. Inlet 22 is fluidly connected with annular space 16, as well as space 26, formed between the body portions 12 and 14. Thus, air is pumped through line 24 and enters the nozzle 10 through inlet 22. The air is then distributed throughout spaces 16 and 26.

FIG. 1 illustrates the positioning of a sleeve insert 40. Nozzle 10 has a forward face 28 with a plurality of atomization ports 30 therein. Each of the ports 30 is aligned with a separate inner body port 19. Each sleeve insert 40 extends through an atomization port 30 and threadably engages the correspondingly aligned inner body port 19. Sleeve inserts are not illustrated in the remaining pairs of ports 19, 30 for better illustration of the nozzle 10. However, those skilled in the art will appreciate that in operation, each pair of the aligned ports 19, 30 will have a sleeve insert 40 therein.

Figure 2:
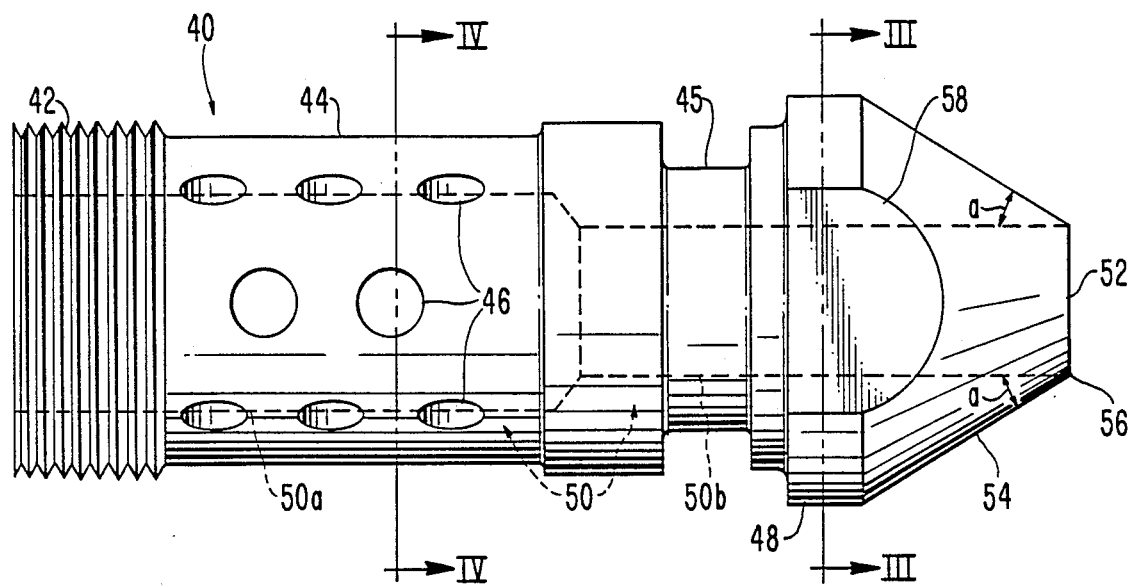
FIG. 2 is a side view of a replaceable sleeve insert according to the present invention.
Figure 3:
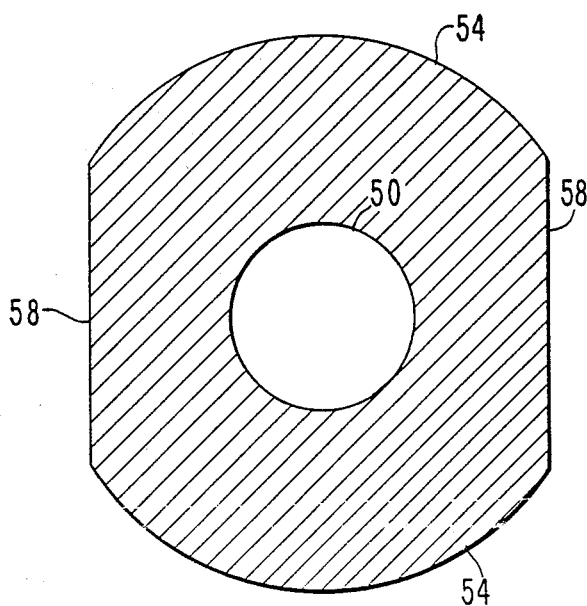
FIG. 3 is a sectional view of the sleeve insert shown in FIG. 2, taken along line III—III.
Figure 4:
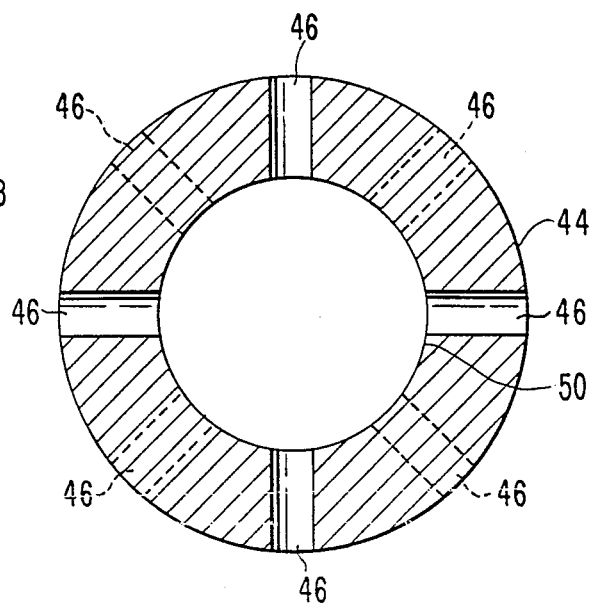
FIG. 4 is a sectional view of the sleeve insert illustrated in FIG. 2, taken along line IV—IV.

Referring now to FIGS. 2-4, there is illustrated the sleeve insert 40 of the present invention. Sleeve insert 40 comprises a threaded base 42, a central portion 44 and a head 48. An interior fluid conveying passage 50 passes completely through the sleeve insert 40. The interior fluid conveying passage 50 consists of two sections 50a, 50b. As shown in FIG. 2, section 50a which passes through central portion 44 has a larger diameter than section 50b which passes through head 48. It is within the scope of the present invention to have an interior fluid conveying passage 50 with a constant diameter along the entire length of the sleeve insert 40. Passage 50 ends at the downstream end of insert 40 at spray outlet 52. Sleeve insert 40 is preferably composed of stainless steel. As is clearly shown in FIG. 2, head 48 has a tapered surface 54 which ends in a circular knife edge 56 at the spray outlet 52.

When surface 54 has a frusto-conical shape as illustrated in FIG. 2 (i.e., surface 54 is tapered inwardly when moving downstream toward the knife edge 56), the angle a formed between surface 54 and interior passage section 50b should be in the range of about 10° to 50°, preferably about 15° to 30°. Surface 54 need not have a "flat" cross section as shown in FIG. 2, but may also be curved. When surface 54 has a curved cross section, the angle a can be determined by drawing a tangent line through a point on the curved surface 54 as will be appreciated by those skilled in the art. Surface 54 preferably has a high degree of smoothness and a low frictional coefficient. This can be accomplished either by polishing surface 54 or by employing a Teflon TM or Silverstone TM coating thereon.

The knife edge 56 is preferably made as sharp as possible in order to minimize the flat annular surface area at the downstream end of insert 40 available for the deposit of solids contained in the sprayed slurry. The annular downstream face of the knife edge 56 has a thickness, measured along a diameter of the insert 40, of less than 1/32 inch and is typically less than 1/64 inch. Preferably, the knife edge 56 is made as sharp as possible taking into account the material used to make the insert 40. As shown in FIG. 2, the interior passage section 50b passing through head 48 has a circular cross section with a constant diameter. The constant diameter of passage section 50b, in combination with the knife edge 56, surprisingly helps to reduce the amount of solids build-up on the downstream end of the sleeve insert 40 when spraying a solids-containing liquid, such as a lime slurry.

A plurality of gas flow passages 46 are provided around the circumference of central portion 44. A necked-down portion 45 is also provided at the downstream end of central portion 44 for the placement of an O-ring 47 (shown in FIG. 1).

As best shown in FIG. 1, sleeve insert 40 may be inserted through atomization port 30 and screwed into an inner body port 19. The O-ring 47 provides a seal between the central portion 44 and the forward face 28 of the nozzle 10. Surfaces 58 provide a convenient flat surface on either side of head 48 (as best shown in FIGS. 2 and 3) for engaging a wrench for tightening the sleeve insert 40 within threaded port 19.

Once the sleeve inserts 40 have been screwed into all of the ports 19, the nozzle 10 can be used for atomizing a slurry and gas mixture. During operation, the slurry is pumped through line 20, inlet 18 and distributed by manifold 21 into the ports 19. When the inserts are threadably engaged in the ports 19, the slurry is directed through the interior passage 50 running through the inserts 40.

A gas, typically air or steam, is pumped through line 24 and inlet 22 into the spaces 16 and 26. The pressure at which the gas is pumped should be maintained slightly greater than the pressure at which the liquid slurry is pumped in the region of the inserts 40. In this way, the gas will flow into passage 50 through the gas flow passages 46 in each of the inserts 40, rather than liquid slurry flowing out of the passages 46. When atomizing a lime slurry, the slurry is typically pumped at a pressure of 30–80 psig and at a temperature of 150° F. while the gas (e.g., air) is pumped at a pressure of 35–85 psig. The gas and slurry are mixed with one another as the mixture is pumped through interior passage 50 and discharged through spray outlet 52.

When atomizing a slurry and air mixture and spraying the atomized mixture into flowing hot combustion exhaust gases, eddy currents from along the forward face 28 of nozzle 10. In prior art nozzles, the eddy currents had a tendency to entrain a small portion of the atomized liquid, causing it to deposit on the forward face 28. The water eventually evaporates leaving a hard crusty deposit of the solids contained in the slurry. Also deposited are any solid particulates, such as fly ash, contained in the hot combustion exhaust gases and contained in the entrained liquid. A third component of the deposited solids is the solid reaction product(s) between the acid gas components of the hot combustion gases and the alkaline slurry (for example, solid calcium sulfate which is the reaction product between $SO_x$ gases and a CaOH slurry). These solid reaction products can also be carried and deposited on the forward face 28 of nozzle 10 and contribute to the amount of solids built up on the forward face 28.

A number of parameters can effect the degree and severity of eddy currents forming along the forward face 28 of the nozzle 10. These include the configuration of the lance 32, the velocity and direction of the flow of hot combustion gases in relation to the positioning of the nozzle 10, the inlet temperature of the hot combustion gases, the concentration of solid particulates in the hot combustion gases, the spray dryer outlet temperature, and the solids content of the atomized slurry. Generally, a protective lance 32 will be provided in order to minimize the severity of these eddy currents. The interior of the lance 32 may be connected to a supply of air at ambient pressure. However, when the nozzle 10 is positioned to spray the slurry and gas mixture in a countercurrent direction with respect to the flow of hot combustion gases, it may be necessary to supply air through the interior of the lance 32 at a slight positive pressure with respect to the pressure of the flowing hot combustion gases in the vicinity of the nozzle 10. As the hot combustion exhaust gases flow past the lance 32, ambient air is drawn or pumped out of the lance 32 and into the conduit or chamber (not shown) which is typically maintained at a slight negative pressure. This helps protect the nozzle 10 from becoming too hot and from exposure to corrosive acid gases and also reduces the strength and severity of the eddy currents forming along face 28. However, even when a lance 32 is provided there is still a tendency for eddy currents to form in the vicinity of the forward face 28.

For this reason, the inserts 40 are provided with a head 48 which extends outwardly beyond the forward face 28 of the nozzle 10 as best shown in FIG. 1. Preferably, the head 48 extends a sufficient distance beyond the forward face 28 so that the spray outlet 52 is positioned substantially beyond these eddy currents. Those skilled in the art will appreciate that the "depth" of the eddy currents, as measured from the forward face 28, will vary depending on the operating parameters of the system, including the presence or absence of a lance, the lance configuration, the velocity and direction of flow of the hot combustion exhaust gases, the inlet temperature of the hot combustion gases, the concentration of solid particulates in the hot combustion gases, the spray dryer outlet temperature, and the solids concentration in the atomized slurry. The optimum length for head 48 will also vary with these same operating parameters. In any event, the optimum length for head 48 can be determined by routine experimentation. In general, the length of head 48 should be long enough to position the spray outlet 52 substantially beyond the eddy currents flowing across face 28 but not so long that the spray outlet 52 extends substantially beyond the drafting effect of the nozzle 10, and lance 32 if any is used, so that the spray outlet 52 is positioned directly in the flow of hot combustion exhaust gases. If the length of head 48 is too long so that the spray outlet 52 is positioned directly in the flow of the hot gases, there is a tendency for any solids build-up which does form to become very dry and hard, making removal difficult. In typical coal-fired boiler exhaust gas scrubbing applications where the slurry is sprayed co-currently with the hot combustion gases, the inlet temperature of the hot combustion gases is in the range of 350° to 450° F., the particulate concentration in the hot combustion gases is in the range of 1–5 grains/SCF, the hot combustion gases have a residence time in the spray drying chamber of 8–15 seconds, the spray dryer outlet temperature is in the range of 20° to 60° F. above the adiabatic saturation temperature, the solids content of the slurry is in the range of 3–17 wt. % (assuming an aqueous calcium hydroxide slurry), the slurry and air mixture is sprayed in a co-current direction with the flow of hot combustion gases and a lance 32 is provided, the head 48 will typically have a length in the range of about $\frac{1}{4}$ to $\frac{3}{4}$ inch. However, in other applications, the head 48 may have a length up to about 2 inches. By positioning the spray outlet 52 substantially beyond the eddy currents, lesser amounts of the atomized liquid are entrained by the eddy currents and deposited on the head 48 and the forward face 28, thereby greatly reducing the rate of solids build-up.

Turning now to FIG. 5, there is illustrated an apparatus for scrubbing hot combustion exhaust gases in order to remove certain components thereof. The apparatus includes a spray dryer 60 having an entrance gas duct 62, an exit gas duct 64, a spray drying chamber 66 and a solids removal line 68. Apparatus of this type (with the exception of the spray nozzles 10 positioned therein) are well known in the art as disclosed in Gehri et al.; U.S. Pat. No. 4,197,278, incorporated herein by reference. Hot flue gases are conducted through duct 62 into the spray drying chamber 66. These gases predominantly comprise products of combustion, such as carbon dioxide and water, but may also contain certain components which are desirably removed before venting the gases to the atmosphere. The undesirable components can include acid gases such as $SO_x$, HX, $NO_x$ and particulates such as fly ash. In order to remove these components from the hot combustion exhaust gases, an aqueous alkaline slurry is typically pumped through line 20 and sprayed out of the nozzles 10. The alkaline slurry is mixed with a gas, typically air or steam, which is fed through lines 22 and mixed with the slurry in the nozzles 10 during atomization.

Typical solids-containing liquid slurries include aqueous slurries of calcium hydroxide, calcium carbonate, sodium carbonate, sodium bicarbonate, sodium hydroxide, magnesium hydroxide, magnesium carbonate and aluminum oxide. Those skilled in the art will realize that solids-containing liquid slurries other than aqueous slurries may also be used. These solids-containing slurries encompass not only slurries in which solid insoluble particles are suspended in a liquid, such as water, but also slurries in which solid soluble particles are suspended in a liquid, such as aqueous slurries of sodium carbonate and sodium bicarbonate.

The alkaline slurry reacts with the acid gas components in the hot combustion exhaust gases, forming solid reaction products such as calcium sulfate, sodium sulfate and/or magnesium sulfate as is well-known to those skilled in the art of scrubbing exhaust gases. A small portion of the solids produced by this reaction are collected and conveyed out of the spray drying chamber 66 through solids removal line 68. The remainder of the solids are collected downstream from line 64 in a particulate collection device (not shown) such as a fabric filter, a mechanical collector, an electrostatic precipitator, or similar device.

Figure 5:
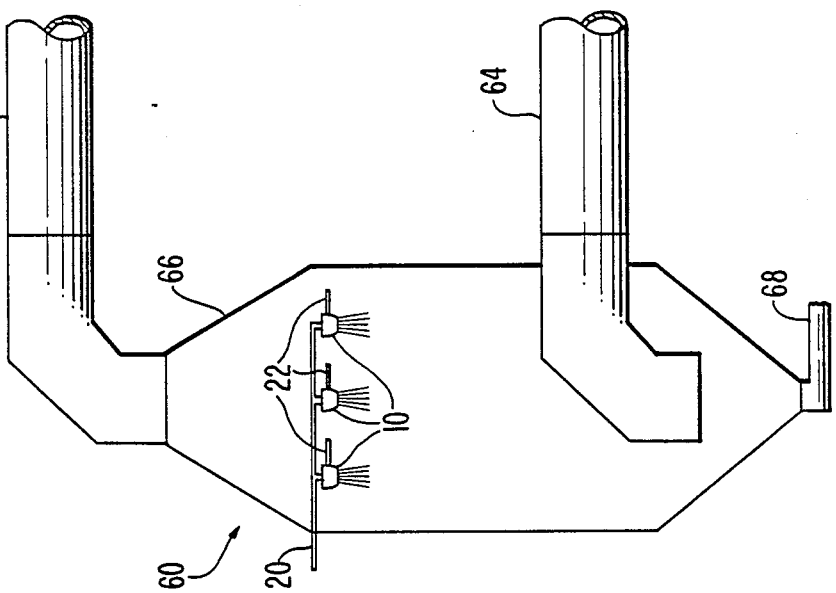
FIG. 5 is a schematic view of a spray dryer showing how nozzles containing the inserts of the present invention may be used in spray drying.

In addition to exhaust gas scrubbing applications, the apparatus illustrated in FIG. 5 may be used in spray drying, spray cooling, spray reaction and spray absorption applications. Examples of products which may be spray dried include foods such as powdered cocoa, instant coffee, powdered milk, powdered eggs, and powdered instant beverages such as tea and fruit drinks. Additional spray dried products include catalysts, resins, detergents, plastics and fertilizers, as well as pharmaceutical/biochemical products such as enzymes, antibiotics, yeasts, vitamins and others. Many of these products are atomized using water as a solvent, although in certain applications such as the above-mentioned pharmaceutical/biochemical applications, organic solvents such as acetone, trichloroethylene, methylene chloride, and ethanol are more typically used. Organic solvents may also be used in chemical applications when making plastics such as polymer powders.

It is believed that in most of the above-mentioned applications, the nozzles are to a certain degree subject to the same solids build-up problems as are nozzles used to spray aqueous alkaline solutions in hot combustion exhaust gas streams. For example, in the spray drying of foods, the food is typically conveyed to the nozzle in the form of aqueous slurry of the solid food product. When the slurry is atomized, it is believed that some of the solid food is deposited on the face of the nozzle in a similar fashion as was described with the deposit of lime on the forward face of a nozzle used to atomize a lime slurry in gas scrubbing applications. The nozzle insert and method of the present invention are similarly advantageous in reducing the rate of solids build-up in these additional applications.

When spray drying food, the liquid slurry is introduced into the nozzles 10 through line 20 and is usually mixed with air introduced through lines 22 into the nozzles 10. Likewise, the hot drying gas introduced through duct 62 is also air. The solids-containing liquid slurry is sprayed through the nozzles 10 into the flow of hot drying gas introduced through duct 62 and flowing downwardly through the spray drying chamber 66. A portion of the spray dried solid product is recovered at the bottom of the spray drying chamber 66 through line 68 while the remaining spray dried product is carried out of the spray drying chamber 66 through line 64 and recovered downstream in a suitable particulate collection device (not shown) as described above.

Although certain embodiments of the invention have been described and illustrated herein, it will be appreciated by those skilled in the art that a wide variety of equivalents may be substituted for the specific elements of the sleeve insert embodiment described herein and that the illustrated embodiment is only a specific example of the present invention the scope of which is defined by the appended claims.

We claim:

1. An improved sleeve insert for use in a nozzle for atomizing a slurry and gas mixture, the nozzle having a hollow body with a slurry inlet, a gas inlet and means fluidly connecting said inlets with at least one atomization port in a forward face of the nozzle, the sleeve insert adapted to be removably received in said port, the insert having a base, a central portion, a head and a interior fluid conveying passage therethrough, the interior passage within the base being fluidly connectable with the liquid slurry inlet, the central portion being fluidly connectable with the gas inlet and having a plurality of gas flow passages for admitting gas into the interior fluid conveying passage for mixing with liquid slurry therein, the head having a spray outlet at the downstream end thereof, the improvement comprising:
   (a) the interior fluid conveying passage having a constant diameter through said head;
   (b) the downstream end of the head having an inwardly tapered surface ending in a circular knife edge at the spray outlet; and
   (c) the head extending out from the forward face of the nozzle.

2. The apparatus of claim 1, wherein the tapered surface is polished.

3. The apparatus of claim 1, wherein the tapered surface has a coating with a high degree of smoothness and a low frictional coefficient.

4. The apparatus of claim 1, wherein the head has two flat wrench-engaging surfaces on opposite sides thereof.

5. In combination with a nozzle for atomizing a slurry and gas mixture, the nozzle having a hollow body with a slurry inlet, a gas inlet and means fluidly connecting said inlets with at least one atomization port in a forward face of the nozzle,
   a sleeve insert removably received in said port, the insert having a base, a central portion, a head and an interior fluid conveying passage therethrough, the interior passage within the base being fluidly connected to the liquid slurry inlet, the central portion being fluidly connected to the gas inlet and having a plurality of gas flow passages for admitting gas into the interior fluid conveying passage for mixing with liquid slurry therein, the head having a spray outlet at the downstream end thereof, the improvement comprising:

(a) the interior fluid conveying passage having a constant diameter through said head;

(b) the downstream end of the head having an inwardly tapered surface ending in a circular knife edge at the spray outlet; and (c) the head extending out from the forward face of the nozzle.

6. The apparatus of claim 5, wherein the nozzle has a plurality of atomization ports in the forward face of the nozzle, each of the atomization ports having a sleeve insert removably received therein.

7. In combination with a nozzle for atomizing a slurry and gas mixture, the nozzle having a hollow body with a slurry inlet, a gas inlet and means fluidly connecting said inlets with at least one atomization port in a forward phase of the nozzle, a sleeve insert removably received in said port, the insert having a base, a central portion, a head and an interior fluid conveying passage therethrough, the interior passage within the base being fluidly connected to the liquid slurry inlet, the central portion being fluidly connected to the gas inlet and having a plurality of gas flow passages for admitting gas into the interior fluid conveying passage for mixing with liquid slurry therein, the head having a spray outlet at the downstream end thereof, the improvement comprising:

(a) the interior fluid conveying passage having a constant diameter through said head;

(b) the downstream end of the head having an inwardly tapered surface ending in a circular knife edge at the spray outlet;

(c) the head extending out from the forward face of the nozzle; and (d) a hollow lance having an open downstream end surrounding said nozzle, the forward face of the nozzle being positioned adjacent the opened end of the lance.

8. The apparatus of claim 5, wherein the nozzle is positioned to spray the mixture into a flowing gas stream, the flowing gas stream creating eddy currents along the forward face of the nozzle.

9. In combination with a nozzle for atomizing a slurry and gas mixture, the nozzle having a hollow body with a slurry inlet, a gas inlet and means fluidly connecting said inlets with at least one atomization port in a forward face of the nozzle, a sleeve insert removably received in said port, the insert having a base, a central portion, a head and an interior fluid conveying passage therethrough, the interior passage within the base being fluidly connected to the liquid slurry inlet, the central portion being fluidly connected to the gas inlet and having a plurality of gas flow passages for admitting gas into the interior fluid conveying passages for mixing liquid slurry therein, the head having a spray outlet at the downstream end thereof, the improvement comprising:

(a) the interior fluid conveying passage having a constant diameter through said head;

(b) the downstream end of the head having an inwardly tapered surface ending in a circular knife edge at the spray outlet; and (c) the head extending out from the forward face of the nozzle; wherein the nozzle is positioned to spray the mixture into a flowing gas stream, the flowing gas stream creating eddy currents along the forward face of the nozzle; and wherein the head has a length sufficient to position the spray outlet beyond the eddy currents.

10. A spray dryer containing at least one nozzle in a spray drying chamber, the nozzle having a hollow body with a slurry inlet, a gas inlet and means fluidly connecting said inlets with at least one atomization port in a forward face of the nozzle, a sleeve insert removably received in said port, the insert having a base, a central portion, a head and an interior fluid conveying passage therethrough, the interior passage within the base being fluidly connected to the liquid slurry inlet, the central portion being fluidly connected to the gas inlet and having a plurality of gas flow passages for admitting gas into the interior fluid conveying passage for mixing with liquid slurry therein, the head having a spray outlet at the downstream end thereof, the improvement comprising:

(a) the interior fluid conveying passage having a constant diameter through said head;

(b) the downstream end of the head having an inwardly tapered surface ending in a circular knife edge at the spray outlet; and (c) the head extending out from the forward face of the nozzle.

11. A method of minimizing solids build-up around an atomization port and on a forward face of a nozzle during atomization of a slurry and gas mixture, the nozzle having a hollow body with a slurry inlet, a gas inlet and means fluidly connecting said inlets with at least one atomization port in the forward face of the nozzle, comprising the steps of:

(a) removably positioning a sleeve insert in said atomization port, said insert having (i) a head with an inwardly tapered surface ending in a circular knife edge at a spray outlet, and (ii) an interior fluid conveying passage, the passage having a constant diameter through said head;

(b) extending the head out from the forward face of the nozzle; and (c) pumping said mixture through said interior fluid conveying passage and out of said spray outlet.

12. The method of claim 11, wherein the slurry is an aqueous alkaline slurry.

13. The method of claim 12, wherein the slurry is selected from the group consisting of aqueous slurries of calcium hydroxide, calcium carbonate, sodium carbonate, sodium bicarbonate, sodium hydroxide, magnesium hydroxide, magnesium carbonate, aluminum oxide and mixtures thereof.

14. The method of claim 11, wherein the gas is selected from air and steam.

15. The method of claim 11, wherein the mixture is atomized into a flowing gas stream.

16. The method of claim 15, wherein the slurry is an aqueous alkaline slurry and the hot gas stream comprises hot combustion exhaust gases.

17. The method of claim 15, wherein the flowing gas stream creates eddy currents along the forward face of the nozzle.

18. A method of minimizing solids buildup around an atomization port and on a forward face of a nozzle during atomization of a slurry and gas mixture, the nozzle having a hollow body with a slurry inlet, a gas inlet and means fluidly connecting said inlets with at least one atomization port in the forward face of the nozzle, comprising the steps of:

(a) removably positioning a sleeve insert in said atomization port, said insert having (i) a head with an inwardly tapered surface ending in a circular knife edge at a spray outlet, and (ii) an interior fluid conveying passage, the passage having a constant diameter through said head;

(b) extending the head out from the forward face of the nozzle; and (c) pumping said mixture through said interior fluid conveying passage and out of said spray outlet;

wherein the mixture is atomized into a flowing gas stream;

wherein the flowing gas stream creates eddy currents along the forward face of the nozzle; and including positioning the spray outlet beyond the eddy currents to minimize the amount of the atomized mixture carried and deposited by the eddy currents onto the head of the insert in the forward face of the nozzle.

19. The method of claim 11, wherein said nozzle has a plurality of atomization ports in the forward face of the nozzle, including removably positioning a sleeve insert in each of the atomization ports.

20. A method of minimizing solids build-up around an atomization port and on a forward face of a nozzle during atomization of a solids-containing aqueous alkaline slurry and air mixture into a stream of combustion exhaust gases flowing past the nozzle, a flowing stream forming eddy currents along the forward face of the nozzle, the nozzle having a hollow body with a slurry inlet, an air inlet and means fluidly connecting said inlets with at least one threaded atomization port in the forward face of the nozzle, comprising:

(a) removably positioning a sleeve insert having a threaded base in said atomization port by threadably engaging the base in the port, said insert having (i) a head with an inwardly tapered surface ending in a circular knife edge at a spray outlet, and (ii) an interior fluid conveying passage, the passage having a constant diameter through said head;

(b) extending the head out from the forward face of the nozzle a sufficient distance so that the spray outlet is positioned substantially beyond the eddy currents to minimize the amount of the atomized mixture entrained by the eddy currents and deposited onto the insert and the forward face of the nozzle; and (c) pumping said mixture through said interior fluid conveying passage and out of said spray outlet.

* * * * *